United States Patent [19]

Ettehadieh

[11] Patent Number: 5,063,368

[45] Date of Patent: Nov. 5, 1991

[54] MAGNETIC ASSEMBLY FOR ENHANCING FUEL COMBUSTION

[76] Inventor: Reza Ettehadieh, 215 S. LaCienega Blvd., No. 101, Beverly Hills, Calif. 90211

[21] Appl. No.: 629,438

[22] Filed: Dec. 18, 1990

[51] Int. Cl.[5] .......................... H01F 7/00; H01F 7/02; B01D 35/06; F02M 27/00

[52] U.S. Cl. .................................... 335/301; 335/306; 335/304; 210/222; 123/538

[58] Field of Search ............... 335/301, 304, 302, 306; 210/222; 123/538

[56] References Cited

U.S. PATENT DOCUMENTS 4,572,145 2/1986 Mitchell et al. ..................... 123/538

4,808,306 2/1989 Mitchell et al. ..................... 123/538

*Primary Examiner*—Leo P. Picard
*Assistant Examiner*—Ramon M. Barrera
*Attorney, Agent, or Firm*—Lyon & Lyon

[57] ABSTRACT

A magnetic assembly adapted to be secured to a fuel line of a motor vehicle for improving the combustion of the fuel passing through the line by disposing the fuel line within a strong concentrated magnetic field without magnetizing portions of the engine proximate the assembly. The assembly comprises a housing, four primary magnets disposed within the housing and arranged in two adjacent columns of two magnets in each column with the south poles of each magnet facing toward the wall of the housing adapted to be disposed adjacent the fuel line, a plate disposed within the housing against the north poles of the two uppermost primary magnets in each column, and four secondary magnets disposed against the plate on the opposite side thereof from the primary magnets. The secondary magnets are substantially weaker in magnetic force than the primary magnets and two of the secondary magnets are aligned over each column of the primary magnets with the south poles of the secondary magnets being disposed against the magnetic plate. Adjustable straps carried by the housing are provided for securing the assembly of the fuel line.

10 Claims, 2 Drawing Sheets

MAGNETIC ASSEMBLY FOR ENHANCING FUEL COMBUSTION

BACKGROUND OF THE INVENTION

The present invention relates to an improved magnetic device particularly adapted for enhancing fuel combustion in motor vehicles. It has been learned that by positioning an assembly of magnets adjacent the fuel line and near the carburetor or fuel injection which generates a relatively strong concentrated magnetic field through the fuel line, fuel combustion is improved, increasing gas mileage and reducing emissions. It is believed that this results from the hydrocarbon molecules in the fuel being broken down by the presence of the concentrated magnetic field whereupon the freed hydrogen molecules attached to additional oxygen molecules which provides for a more complete combustion and reduces the number of unburned hydrocarbons. For reasons not know, these beneficial effects are best achieved when the magnets are oriented such that their south poles face the fuel line. It has been found, however, that these beneficial effects decrease over time. It is believed that this decrease in effectiveness results from portions of the vehicle's engine proximate the magnets becoming magnetized and interfering with the lines of magnetic force in the area of the fuel line. Efforts have been made to reduce the strength of the magnetic field adjacent the engine in which a magnetic steel plate was placed against the north poles of the magnets facing the engine in an attempt to draw the magnetic field adjacent the engine toward the plate. Such efforts have not proved successful.

By the present invention, a magnetic assembly is provided which not only concentrates the magnetic lines of induction in the area of the fuel line and orients those lines in a substantially parallel disposition as they pass through the fuel line, maximizing the beneficial effects of the magnetic field on the fuel, but also minimizes the strength of the magnetic force adjacent the engine to prevent the engine from becoming magnetized.

In addition to the above automotive application, it has been found that passing other fluid fuels through a concentrated magnetic field similarly improves the combustion of such fuels and decreases emissions. It is also known that passing water through a magnetic field will tend to soften the water. The magnetic assembly of the present invention, while developed to prolong the life of improved fuel combustion in a automobile engine through the use of a magnetic field, can be used in other such applications to concentrate the magnetic field about the fluid and minimize dispersion of the field in other directions.

SUMMARY OF THE INVENTION

Briefly, the present invention comprises a magnetic assembly which is particularly adapted to be secured to a fuel line in a conventional gasoline burning motor vehicle and create a strong concentrated magnetic field passing through the fuel line adjacent one side thereof to break down the hydrocarbons in the fuel and improve combustion and a weak magnetic field proximate the opposite side of the assembly to avoid magnetizing portions of the vehicle's engine. The magnetic assembly comprises a housing constructed of a non-magnetic material and having a first end wall adapted to be secured adjacent the fuel line and second end wall spaced from the first end wall to define a magnet cavity therebetween. Disposed within the cavity are four rectangular relatively strong magnets arranged in two adjacent columns of two magnets each with the south poles of each magnet being defined by the side of the magnet facing the first end wall of the housing. A flat plate, preferably of a non-magnetic metal material such as aluminum, is disposed against the north poles of the two upper magnets in each column and the second end wall of the housing. Four smaller an weaker secondary magnets are disposed against the opposite side of the plate from the larger rectangular magnets with two of the secondary magnets being aligned over each column of the larger rectangular magnets such that the south poles of the secondary magnets are disposed against the plate.

In an alternate embodiment of the invention, the south poles of the smaller and weaker secondary magnets are disposed directly against the north poles of the two upper larger magnets proximate the second end of the housing and the flat plate of magnetic material is disposed over and against the north poles of the secondary magnets adjacent the second end of the housing.

Through the aforesaid assemblies, the lines of magnetic induction project outwardly from the south poles of the two columns of large rectangular magnets through the first side of the housing and are compressed by the adjacent south poles in each column such that they pass through the fuel line in a substantially parallel disposition, concentrating the magnetic force of the assembly through the fuel line. The magnetic lines of induction then extend about the magnets and are drawn inwardly to the north poles through the smaller and weaker secondary magnets and magnetic plate, thereby substantially reducing the projection of the magnetic field from the second side of the housing and minimizing the magnetizing of portions of the engine proximate the second side of the housing. By so concentrating the magnetic field of the magnet assembly through the fuel line and avoiding the magnetizing of the vehicle engine, the deterioration over time of the enhanced fuel combustion resulting from the presence of such a magnet field through the fuel line is avoided or substantially delayed.

It is the principal object of the present invention to provide an improved magnetic assembly of the type secured to a fuel line in a motor vehicle to improve fuel combustion which avoids magnetizing the vehicle engine and the deterioration of such improved fuel combustion.

It is another object of the present invention t provide a magnetic assembly which concentrates a strong magnetic field from one side thereof to obtain the beneficial effects of passing fluids therethrough while minimizing the strength of the magnetic field proximate the opposite side thereof to avoid magnetizing any magnetic materials disposed proximate said opposite side.

These and other objects and advantages of the present invention will become readily apparent from the following detailed description taken in conjunction with the accompanying drawings.

Figure 1:
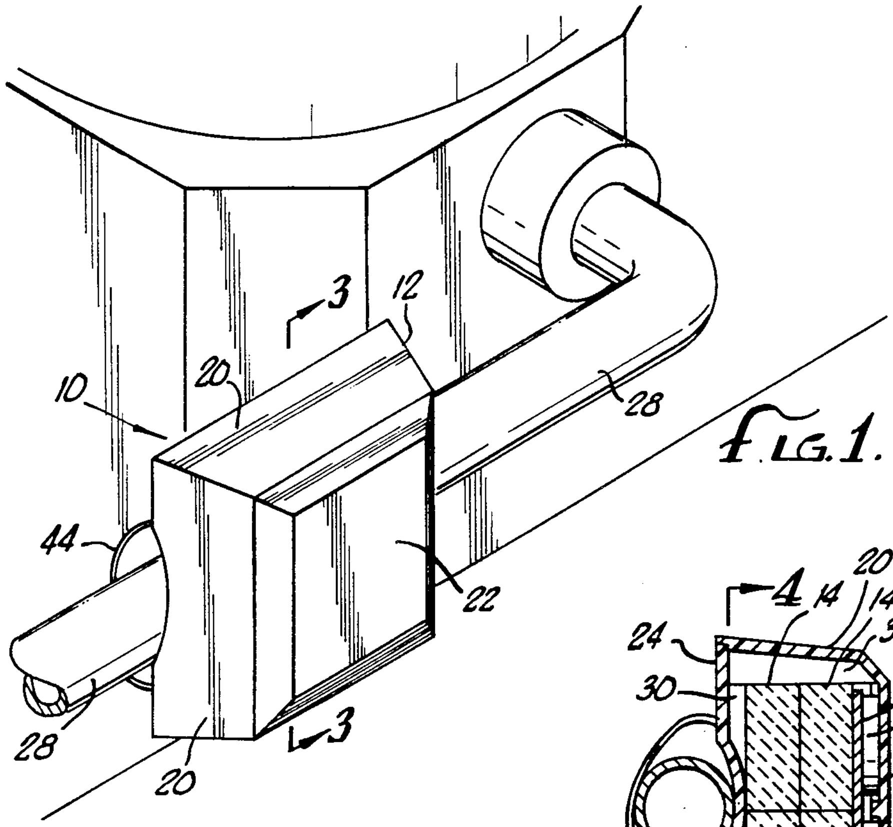
FIG. 1 is a perspective view of the magnetic device of the present invention secured to a fuel line in a motor vehicle.

Referring now in detail to the drawings, the magnetic assembly 10 of the present invention comprises housing 12 constructed of a non-magnetic plastic material having a high melting point such as plastic, four strong primary magnets 14, preferably rectangular in configuration and each having a strength of about 1,000–1,500 gauss, a flat rectangular plate 16 which is preferably constructed of a non-magnetic material such as aluminum and disposed between magnets 14 and four smaller and weaker secondary magnets 18, each having a strength of about 200–300 gauss.

Housing 12 defines side walls 20, top wall 22 and a bottom wall 24. Bottom wall 24 defines a curved recess 26 in the outer surface thereof for alignment of the housing 12 with the vehicle fuel line 28 to which the assembly 10 is to be secured. The interior of housing 12 defines a magnet receiving cavity 30 therein and a plurality of ribs 32 projecting inwardly from the side walls 20 to abut the sides of rectangular primary magnets 14 and retain the magnets 14 in proper alignment within the cavity 30. A plurality of perpendicularly disposed ridges 34 are defined in the interior side of top wall 22 to retain the proper alignment of the secondary magnets 18.

The four large rectangular magnets 14 are each virtually identical strength and size and configured such that the magnetic north and south poles are defined by their largest opposite sides 36 and 38 respectively. Primary magnets 14 are arranged within housing 12 in a stacked configuration of two adjacent columns, with two magnets in each column and the south poles of each magnet facing the bottom side wall 24 of housing 12 and fuel line 28 and the north poles facing towards the top wall 22 of the housing as seen in FIG. 7.

The flat plate 16 is disposed within housing 12 over and against the sides 36 of primary magnets 14 defining the north poles thereof and is held there against by the magnetic force of magnets 14. The four secondary magnets 18 are each virtually identical and configured such that there magnetic north and south poles are defined by their opposite sides 40 and 42 respectively with the sides 42 defining the south poles being disposed adjacent the opposite side of plate 16 from the larger magnets 14.

Figure 3:
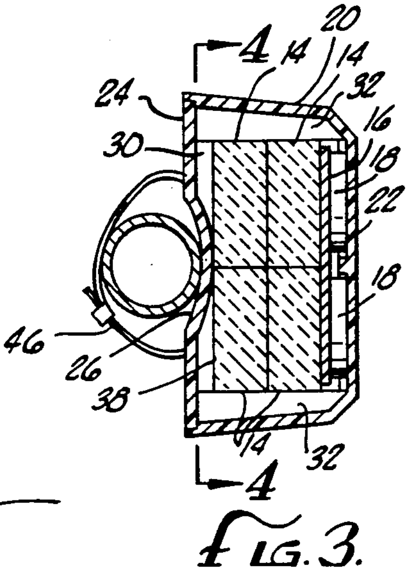
FIG. 3 is a sectional view taken along line 3—3 in FIG. 1.
Figure 2:
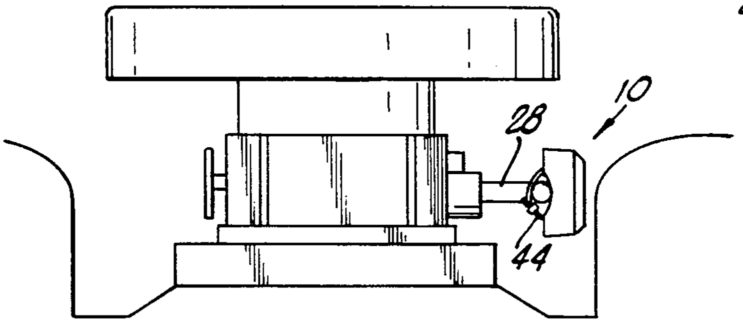
FIG. 2 is a frontal view of the magnetic device of the present invention secured to a fuel line and automobile.
Figure 4:
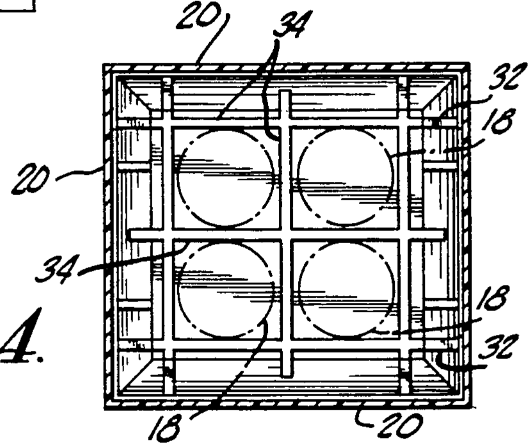
FIG. 4 is a sectional view taken along line 4—4 in FIG. 3.
Figure 5:
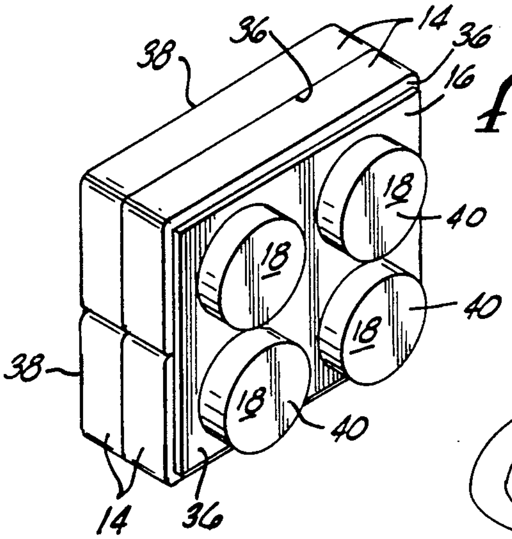
FIG. 5 is a perspective view of the magnets of the present invention.

The magnets 14 and 18 and plate 16 are inserted into chamber 30 within housing 12 prior to securing the bottom wall 24 in place on the housing by a suitable adhesive or other fastening means. A pair of one way flexible tie straps 44 and 46 extend through pairs of apertures (not shown) formed in the bottom wall 24 of the housing for anchoring the assembly 10 to the vehicle fuel line 28 such that the bottom wall of the housing is held against the fuel line as seen in FIGS. 1-3.

Figure 6:
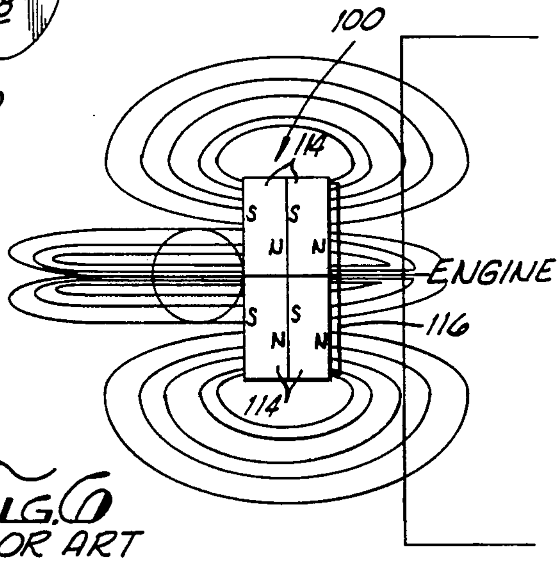
FIG. 6 PRIOR ART
FIG. 6 is a schematic representation of a prior art device disposed adjacent a fuel line and proximate a vehicle engine and illustrating the lines of magnetic induction generated by the prior art device.
Figure 7:
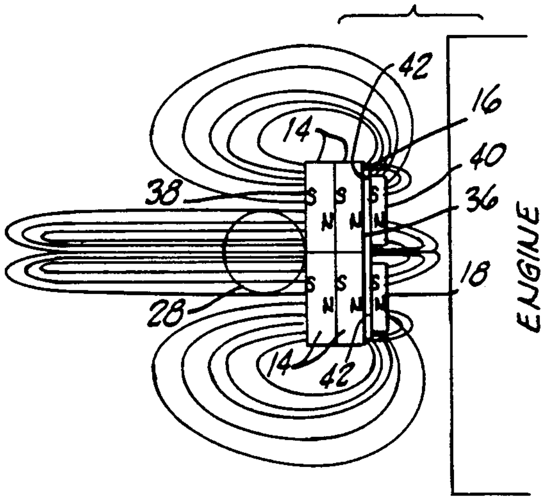
FIG. 7 is a schematic representation of the present invention disposed adjacent a fuel line and proximate a vehicle engine and illustrating the lines of magnetic induction generated by the present invention.

Through the above described configuration, the lines of magnetic induction generated by the magnetic assembly 10 are compressed and concentrated in the area of the fuel line 28 by virtue of the aforesaid note alignment such that the lines extend substantially parallel to one another as they pass through the fuel line 28 as seen in FIG. 7. In the prior art devices represented in FIG. 6, the assembly 100 comprises four separate magnets 114 and a flat magnetic plate 116 disposed there against within a housing (not shown) similar to housing 12. The lines of magnetic induction emanating from the central portion of the prior art assembly project fairly uniformly from both sides of the stacked magnets 114 with a slight extension from the southern poles of the magnet due to the presence of the metal plate 102, as seen in FIG. 6. This results in a magnetizing of the portion of the vehicle engine disposed adjacent the magnets and within the magnetic field generated thereby. By utilizing the configuration of the present invention, the projection of the lines of magnetic inductance toward the engine is substantially reduced, as illustrated in FIG. 7 due to the presence of the secondary magnets 18 held against the flat plate 16. By reducing the magnetic field in the area proximate the north poles of the magnets and top wall 22 of housing 10, the vehicle engine is prevented from being magnetized and the longevity of improved combustion resulting from the presence of the magnetic field through the fuel line is significantly increased.

Figure 8:
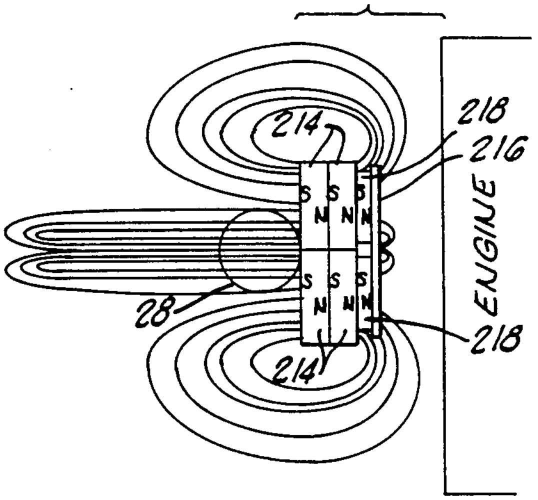
FIG. 8 is a schematic representation of the alternative embodiment of the present invention disposed adjacent a fuel line and proximate a vehicle engine and illustrating the lines of magnetic induction generated by the second embodiment.

FIG. 8 illustrates an alternate embodiment of the present invention which differs from the prior embodiment in that the secondary small magnets 218 are disposed directly against the primary magnets 214 such that the south poles of the secondary magnets abut the north poles of the primary magnets and the magnetic plate 216 is disposed against the north poles of the secondary magnets adjacent the top wall of the housing (not shown). It is been found that through this alternate embodiment, the strength of the magnetic field in the area proximate the top wall of the housing is even further reduced as compared to the prior embodiment.

In this alternate embodiment of the invention, magnets 214 and 218 and plate 216 are identical to magnets 14 and 18 and plate 16 of the prior embodiment. The housing for the alternate embodiment is substantially identical to housing 12 except that the ridges 34 on the interior side of the top wall 22 of housing 12 would be configured so as to conform with the shape of the plate 216 for holding the plate in place within the housing as opposed to being designed to hold the secondary magnets 18 in place. The secondary magnets 218 in the alternate embodiment would tend to stay in place due to the strong magnetic attraction between magnets 118 and the primary 214.

Various changes and modifications may be made in carrying out the present invention without departing from the spirit and scope thereof. Insofar as these changes and modifications are within the purview of the appended claims, they are to be considered as part of the present invention.

I claim:

1. In a magnetic assembly of the type adapted to be secured to a fuel line of a motor vehicle for improving the combustion of the fuel passing through the line and comprising a housing, a plurality of strong magnets disposed within the housing and arranged in two adjacent columns with at least two magnets in each column and the south poles of each magnet facing toward the wall of the housing adapted to be disposed adjacent the fuel line, and a substantially flat plate disposed within the housing against the north poles of the two uppermost magnets in each column, the improvement comprising: four secondary magnets disposed against the plate on the opposite side thereof from the strong magnets, said secondary magnets being substantially weaker in magnetic strength than the strong magnets and two of said secondary magnets being aligned over each column of the strong magnets with the south poles of said secondary magnets being disposed against the plate.

2. The improvement of claim 1 wherein said plate is constructed of a non-magnetic material and each of the strong magnets generates a magnetic field within the range of about 1,000–1,500 gauss and each of said secondary magnets generates a magnetic field within the range of about 200–300 gauss.

3. In a magnetic assembly of the type adapted to be secured to a fuel line of a motor vehicle for improving the combustion of the fuel passing through the line and comprising a housing, a plurality of strong magnets disposed within the housing and arranged in two adjacent columns with at least two magnets in each column and the south poles of each magnet facing toward the wall of the housing adapted to be disposed adjacent the fuel line, and a substantially flat plate disposed within the housing against the north poles of the two uppermost magnets in each column, the improvement comprising: four secondary magnets disposed between and in contact with the strong magnets and the plate, said secondary magnets being substantially weaker in magnetic strength than the strong magnets and two of said secondary magnets being aligned over each column of the strong magnets with the south poles of said secondary magnets being disposed against the north poles of the two uppermost strong magnets in said columns.

4. The improvement of the claim 3 wherein said plate is constructed of a non-magnetic material and each of the strong magnets generates a magnetic field within the range of about 1,000–1,500 gauss and each of said secondary magnets generates a magnetic field within the range of about 200–300 gauss.

5. A magnetic assembly adapted to be secured to a fuel line of a motor vehicle for improving the combustion of the fuel passing through the line, said assembly comprising:

a housing having a top, bottom and side walls;

means carried by said housing for securing said assembly to the fuel line such that said bottom wall is disposed against the fuel line;

a plurality of primary magnets disposed within said housing and arranged in two adjacent columns with at least two primary magnets in each column and the south poles of each primary magnet facing toward said bottom wall of said housing;

a substantially flat plate disposed within said housing against the north poles of the two uppermost magnets in said columns; and four secondary magnets disposed against said plate on the opposite side thereof from said primary magnets and adjacent said top wall of said housing, said secondary magnets being substantially weaker in magnetic strength then said primary magnets and two of said secondary magnets being aligned over each column of said primary magnets with the south poles of said secondary magnets being disposed against said plate.

6. The magnetic assembly of claim 5 wherein said plate is constructed of a non-magnetic material and each of said primary magnets generates a magnetic field within the range of about 1,000–1,500 gauss and said secondary magnets each generates a magnetic field within the range of about 200–300 gauss.

7. The magnetic assembly of claim 6 wherein said primary magnets comprise ceramic material and are rectangular in configuration.

8. A magnetic assembly adapted to be secured to a fuel line of a motor vehicle for improving the combustion of the fuel passing through the line, said assembly comprising:

a housing having a top, bottom and side walls;

means carried by said housing for securing said assembly to the fuel line such that said bottom wall is disposed against the fuel line;

a plurality of primary magnets disposed within said housing and arranged in two adjacent columns with at least two primary magnets in each column and the south poles of each primary magnet facing toward said bottom wall of said housing;

four secondary magnets disposed within said housing, said secondary magnets being substantially weak in magnetic strength than said primary magnets and two of said secondary magnets being disposed against each of the uppermost primary magnets in said columns with the south poles of said secondary magnets being disposed against the north poles of said two uppermost primary magnets; and a substantially flat plate disposed against the north poles of said secondary magnets proximate said top wall of said housing.

9. The magnetic assembly of claim 8 wherein said plate is constructed of a non-magnetic material and each of said primary magnets generates a magnetic field within the range of about 1,000–1,500 gauss and said secondary magnets each generates a magnetic field within the range of about 200–300 gauss.

10. The magnetic assembly of claim 9 wherein said primary magnets comprise ceramic material and are rectangular in configuration.

* * * * *